US006274094B1

(12) United States Patent
Weller, III et al.

(10) Patent No.: US 6,274,094 B1
(45) Date of Patent: *Aug. 14, 2001

(54) NESTABLE, MODULAR APPARATUS FOR SYNTHESIS OF MULTIPLE ORGANIC COMPOUNDS

(76) Inventors: Harold Norris Weller, III, 113 Mine Rd., Pennington, NJ (US) 08534; Waldemar Ruediger, 130 Equestrian Dr., New Hope, PA (US) 18938; R. Michael Lawrence, 48 W. Crown Terr., Yardley, PA (US) 19067

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 55 days.

(21) Appl. No.: 08/991,474

(22) Filed: Dec. 16, 1997

Related U.S. Application Data
(60) Provisional application No. 60/035,105, filed on Jan. 13, 1997.

(51) Int. Cl.[7] .................................................. B01J 19/00
(52) U.S. Cl. .......................... 422/130; 422/99; 422/100; 422/101; 422/102; 422/103; 422/104; 422/129; 422/131; 422/134
(58) Field of Search ................................ 422/63, 81, 99, 422/100, 103, 104, 129, 131, 134, 138, 101; 436/43, 180, 183, 174, 177

(56) References Cited

U.S. PATENT DOCUMENTS

| 4,154,795 | 5/1979 | Thorne . |
|---|---|---|
| 4,304,865 | 12/1981 | O'Brien et al. . |
| 4,319,841 | 3/1982 | Suovaniemi et al. . |
| 4,483,964 | 11/1984 | Urdea et al. . |

(List continued on next page.)

FOREIGN PATENT DOCUMENTS

| 196 05 814 | 8/1997 | (DE) . |
|---|---|---|
| WO 96/15450 | 5/1996 | (WO) . |
| WO 96/42004 | 12/1996 | (WO) . |

(List continued on next page.)

OTHER PUBLICATIONS

"Computer–assisted automatic synthesis II. Development of a fully automated apparatus for preparing substituted N–(carboxyalkyl) amino acids", Hayashi et al, Journal of Automatic Chemistry, vol. 11, No. 5, Sep.–Oct. 1989, pp. 212–220.

(List continued on next page.)

*Primary Examiner*—Jill Warden
*Assistant Examiner*—Dwayne K. Handy
(74) *Attorney, Agent, or Firm*—Robert L. Epstein; Harold James; James & Franklin, LLP (57) ABSTRACT

The simultaneous synthesis of diverse organic compounds is performed in stackable modules which are moveable among nesting sites located on work station platforms. The reactor module includes a heat transfer block adapted to receive an array of reactor vessels, preferably in the form of solid phase extraction cartridges without sorbent, each with an outlet port. A plurality of valves are located below the vessels. The valves consist of rows of gang-controlled stopcocks which regulate the passage of fluids from the reactor vessel outlet ports into aligned channels, each formed by a pair of threated Leur tip adapters. The reactor module may be situated over a discharge module. The inlet openings in the discharge module accept the threaded ends of the Leur tip adapters. The discharge module may consist of a multi-well collector block or a drain block. An introduction module, which includes a pressure plate having an array of openings and a septum, may be received over the reactor module. The downwardly projecting rim defining each pressure plate opening cooperates with the septum to engage the mouth of the aligned reactor vessel to maintain a fluid tight seal.

11 Claims, 8 Drawing Sheets

U.S. PATENT DOCUMENTS

| | | |
|---|---|---|
| 4,517,338 | 5/1985 | Urdea et al. . |
| 4,659,222 | 4/1987 | Ekholm . |
| 4,746,490 | 5/1988 | Saneli . |
| 4,797,259 | 1/1989 | Matkovich et al. . |
| 4,909,933 * | 3/1990 | Carter et al. ........................... 210/95 |
| 4,948,442 | 8/1990 | Manns . |
| 4,948,564 | 8/1990 | Root et al. . |
| 4,970,165 | 11/1990 | Uhrin . |
| 5,039,493 | 8/1991 | Oprandy . |
| 5,048,957 | 9/1991 | Berthold et al. . |
| 5,053,454 | 10/1991 | Judd . |
| 5,108,704 | 4/1992 | Bowers et al. . |
| 5,219,528 | 6/1993 | Clark . |
| 5,240,680 | 8/1993 | Zuckermann et al. . |
| 5,252,296 | 10/1993 | Zuckermann et al. . |
| 5,283,039 | 2/1994 | Aysta . |
| 5,288,468 | 2/1994 | Church et al. . |
| 5,324,483 | 6/1994 | Cody et al. . |
| 5,342,581 | 8/1994 | Sanadi . |
| 5,368,823 | 11/1994 | McGraw et al. . |
| 5,380,495 | 1/1995 | Chang et al. . |
| 5,472,672 | 12/1995 | Brennan . |
| 5,503,805 | 4/1996 | Sugarman et al. . |
| 5,512,168 | 4/1996 | Fetner et al. . |
| 5,529,756 | 6/1996 | Brennan . |
| 5,538,694 | 7/1996 | Delius . |
| 5,541,314 | 7/1996 | McGraw et al. . |
| 5,559,032 | 9/1996 | Pomeroy et al. . |
| 5,574,656 | 11/1996 | Agrafiotis et al. . |
| 5,585,069 | 12/1996 | Zanzucchi et al. . |
| 5,593,838 | 1/1997 | Zanzucchi et al. . |
| 5,603,351 | 2/1997 | Cherukuri et al. . |
| 5,609,826 | 3/1997 | Cargill et al. . |
| 5,614,608 | 3/1997 | Krchnak et al. . |
| 6,045,755 * | 4/2000 | Lebl et al. ............................. 422/65 |

FOREIGN PATENT DOCUMENTS

| | | |
|---|---|---|
| WO 97/07126 | 2/1997 | (WO) . |
| WO 97/10896 | 3/1997 | (WO) . |
| 9839099 | 9/1998 | (WO) . |
| 9840159 | 9/1998 | (WO) . |

OTHER PUBLICATIONS

"Diversomers': An approach to nonpeptide, nonoligomeric chemical diversity", DeWitt et al, 1993, pp. 6909–6913.

"The Diversomer Approach: Integration and Automation of Multiple, Simultaneous Organic Synthesis on a Solid Support" DeWitt et al, ISLAR '93 Proceedings, pp. 1–15.

"Design, construction and application of a fully automated equimolar peptide mixture synthesizer", Zuckermann et al., 1992, pp. 497–506.

"Automated Chemical Synthesis", Main et al, Zeneca Pharmaceuticals, Cheshire, UK, 10 pages.

"Radiofrequency Encoded Combinatorial Chemistry", Nicolaou et al, Angew Chem. Int. Ed. Engl. 1995 34 No. 20, pp. 2289–2291.

"Radio Frequency Tag Encoded Combinatorial Library Method for the Discovery of Tripeptide–Substituted Cinnamic Acid Inhibitors of the Protein Tyrosine Phosphatase PTPIB", Moran et al, J. Am. Chem. Soc. 1995 117, pp. 10787–10788.

"Automated Combinatorial Chemistry on Solid Phase", Cargill et al, 1996, pp. 139–148.

* cited by examiner

NESTABLE, MODULAR APPARATUS FOR SYNTHESIS OF MULTIPLE ORGANIC COMPOUNDS

This appln claims benefit of Provisional No. 60/035,105 filed Jan. 13, 1997.

The present invention relates to apparatus for the simultaneous parallel synthesis of large numbers of diverse organic compounds for use in combinatorial drug research and more particularly to a nestable, modular apparatus designed for that purpose which is portable so as to be moveable among work station nest sites and which includes a reactor block with unique mechanical valve means.

Efficient testing of organic compounds in the modern pharmaceutical laboratory requires the synthesis of large numbers of diverse organic molecules in an automated and high speed system. The present invention is designed for use in such a system, particularly one which employs solid phase synthesis techniques.

During the course of the synthesis, various operations must be performed on the samples, including reagent introduction and removal, agitation, washing and compound removal. Precise control of temperature, pressure and atmospheric gas mixtures may be required at various stages. These operations are standard and can be performed at work stations which have been designed or modified for use with multiple reactors.

Over the last few years, a number of different systems have been developed to produce large numbers of specific types of organic molecules, such as polynucleotides. However, the usefullness of such systems tends to be limited to the particular type of molecule the system was designed to produce. Our invention is much more general in application. It can be used to synthesize all types of organic compounds including those used in pharmaceutical research, the study of DNA, protein chemistry, immunology, pharmacology or biotechnology.

Aside from the lack of versitility, existing equipment for automated organic synthesis tends to be either overly complex, requiring equipment which is exceedingly costly to fabricate and operate or too limited as to flexibility, speed, and the number and amount of compounds which can as be synthesized. As will become apparent, our invention has a simple, elegant design which is relatively inexpensive to fabricate and operate, is extremely flexible and is capable of producing large numbers and amounts of all types of organic compounds in a high speed, automated manner.

One existing system was developed for use at Zeneca Pharmaceuticals, Alderley Park, Macclesfield, Cheshire, SK10 4TG, United Kingdom. That system is built around an XP Zymate laboratory robot (Zymark Corporation, Hopkinton, Mass.). The robot arm is situated in the middle of a plurality of stationary work stations arranged in a circle. The arm is programmed to move one or more tube racks from one station to another. However, such a system has limited throughput capability as the number of tube racks which can be handled at one time is limited.

An automated peptide synthesizer developed for Chiron Corporation of Emevyville, Calif., which has similar limitations, is described by Ronald N. Zukermann, Janice M. Kerr, Michael A. Siani and Steven C. Banville in an article which appeared in the International Journal of Peptide and Protein Research, Vol. 40, 1992, pages 497–506 entitled "Design, Construction and Application of a Fully Automated Equimolar Peptide Mixture Synthesizer". See also U.S. Pat. No. 5,252,296 issued Oct. 12, 1993 to Zukermann et al. entitled "Method and Apparatus For Biopolymer Synthesis".

Another approach was developed at Takeda Chemical Industries, Ltd. and is described in an article published in the Journal of Automatic Chemistry, Vol. 11, No. 5 (September–October 1989) pp. 212–220 by Nobuyoshi Hayashi, Tobru Sugawara, Motoaki Shintani and Shinji Kato entitled "Computer-assisted Automatic Synthesis II. Development of a Fully Automated Apparatus for Preparing Substituted N- (carboxyalkyl) Aminio Acids". The Takeda system includes a plurality of stationary units which are computer controlled. The reactor unit includes only two reaction flasks. A plurality of computer controlled solenoid valves regulate the input flow from the reactant supply unit and wash solvent supply unit as well as output to the purification unit, exhaust and drainage unit. Sensors and electrodes feed information back to the computer. This system is complex, costly and inflexible. It is also very limited with respect to the number of compounds which can be synthesized.

A more flexible approach has been suggested by the Parke-Davis Pharmaceutical Research Division of Warner-Lambert as described by Sheila Hobbs DeWitt et al. in Proc. National Academy of Science, USA, Vol. 90, pp. 6909–6913 August 1993 and in the ISLAR '93 Proceedings. This system employs a Tecan robotic sample processor. A manifold of gas dispersion tubes are employed in combination with glass vials. The glass frits of the tubes contain the solid support during reactions. However, samples from the reaction tubes must be removed from above, using a modified needle as a probe, as there is no facility for removal from the bottom of the tubes. Accordingly, discharge from the reactor vessels in the Parke-Davis system is awkward and time consuming.

U.S. Pat. No. 5,472,672 issued Dec. 5, 1995 to Thomas Brennan, entitled "Apparatus and Method for Polymer Synthesis Using Arrays", teaches the use of an automated system in which a transport mechanism is used to move a base with an array of reactor wells in conveyor belt fashion from work station to work station. Sample removal is performed by creating a pressure differential between the ends of the wells. Aside from the difficulties with regard to discharge, this system is complex and lacks flexibility.

We are also aware of system designed by the Ontogen Corporation of Carlsbad, Calif. 92009 as disclosed by John F. Cargill and Romaine R. Maiefski in Laboratory Robotics and Automation, Vol. 6 pp. 139–147 in an article entitled "Automated Combinatorial Chemistry on Solid Phase". This system utilizes a reactor block having an array of reactor vessels. The block is moved along an assembly line of work stations under computer control. However, that system is highly complex, expensive and lacks flexibility. Moreover, it does not include any valving structure capable of regulating the removal of compounds from the bottom of the reactor vessels.

Our approach to the automation problem is to employ modules of relatively simple design and construction which can be arranged in sets to perform the required operations and which are easily moveable among nest sites situated at standard work stations. This system permits the greatest amount of flexibility at the least cost. The modules are relatively inexpensive and can be arranged as needed. As many of the module sets can be assembled and employed at one time as there are available nesting sites. Several nest sites may be created at a single work station, such as an orbital shaker. For time consuming operations, several work stations can be in use simultaneously, to permit parallel flow of module sets and therefore eliminate bottlenecks. For less time consuming operations, fewer work stations can be used, as long as the flow of module sets is not impeded. Accordingly, maximum throughput is achieved with minimum investment.

In addition, our apparatus includes a reactor module which is designed to permit sample removal from the bottom of the reactor vessels through the use of a novel multi-valve system located beneath the reactor block. The system includes rows of gang-controlled mechanical valves which regulate the passage of fluids through the reactor vessel outlets in an extremely efficient manner. The valves, in the form of stopcocks, can be closed and locked into position to prevent leakage. This is possible due to the use of pairs of uniquely configured control arm positioning rails associated with each row of stopcocks. All of the rail pairs can be manipulated simultaneously to open and close all of the stopcocks in unison.

The reactor module of the present invention also includes a temperature controllable reactor block located above the valve structure which accepts an array of reactor vessels. The vessels are preferably standard solid phase extraction cartidges, without sorbent.

The reactor module is adapted to mount over a discharge module. The discharge module may consist of either a collector block with an array of collection wells or a drain block. The connections between the stopcock outlets and the discharge module are formed by pairs of Leur tip adapters threaded into the base of the reactor block. The outlets of the Leur tip adapters are received in inlet openings in the discharge module.

An introduction module is adapted to mount over the reactor module and includes a septum situated between a pressure plate and the open mouths of the reactor vessels. The pressure plate has a plurality of openings defined by downwardly protruding rims. The rims cooperate with the septum to seal the mouths of the reactor vessels. This permits the introduction of reagents and other fluids into the reactor vessels by syringe needles without the necessity of removing caps or other closure devices.

Internal supports and external brackets are used to facilitate alignment of the modules as the required module sets are formed. External locking devices insure stability. Simple nesting brackets with chamfered surfaces make installation of the module sets on the work stations a quick and easy task.

Since the modifications to standard work stations to accept the module sets of the present invention are simple and inexpensive to make, little time or cost is involved in converting a conventional laboratory for use with the present invention. This dramatically increases the speed of the set up of a facility to perform the synthesis process, as customized work stations, specialized computers and complex interfaces are not required.

It is, therefore, a prime object of the present invention to provide apparatus for the synthesis of multiple organic compounds which is mechanically simple, relatively inexpensive to construct, does not require extensive set up time, is extremely flexible and has high throughput.

It is another object of the present invention to provide apparatus for the synthesis of multiple organic compounds which consists of a plurality of stackable modules adapted to be moved as a unit among nest sites on work station platforms.

It is another object of the present invention to provide apparatus for the synthesis of multiple organic compounds which includes a reactor module with gang-controlled mechanical valves for regulation of the passage of fluids from the reactor vessel outlet ports.

It is another object of the present invention to provide apparatus for the synthesis of multiple organic compounds which includes a discharge module (in the form of a collector block or a drain block) which receives the outlets of Leur tip adapters to connect the reactor block to the discharge module, when these modules are assembled.

It is another object of the present invention to provide apparatus for the synthesis of multiple organic compounds which includes an introduction module having a septum and a pressure plate which cooperate to seal the open mouths of the reactor vessels while permitting the introduction of fluids into the reactor vessels by needle.

In accordance with one aspect of the present invention, apparatus for the synthesis of multiple organic compounds is provided for use with one or more work stations. The apparatus comprises a reactor module including a reactor block adapted to receive an array of individual reactor vessels, each vessel having an outlet port. The reactor block also includes gang-controlled mechanical valve means for regulation of the passage of fluids through the individual vessel output ports. Nesting means are associated with each work station and adapted to receive and retain the apparatus on the work station.

A discharge module is provided. The reactor module is adapted to be mounted over the discharge module. Means for mounting the reactor module over the discharge module are provided.

An introduction module is also provided. The introduction module is adapted to be mounted over the reactor module. Means are provided for mounting the introduction module over the reactor module.

The reactor block comprises heat transfer means. The heat transfer means contols the temperature of the reactor vessels.

The valve means comprises an array of stopcocks. Each of the stopcocks is associated with a rotatable control arm. Means are provided for simultaneously rotating the control arms to open and close the stopcocks.

The means for simultaneously rotating the control arms includes first and second relatively moveable rails. Means are provided for connecting the stopcock control arms to each of the rails, such that the relative movement of the rails simultaneously rotates each of the control arms attached thereto.

Each of the rails comprises a plurality of alternating protrusions and recesses. The protrusions of one of the rails are received within the recesses of the mating rail when the rails are moved toward each other to insure that the stopcocks are tightly closed.

The stopcocks are arranged in rows. A pair of relatively moveable rails is associated with each row of stopcocks. Means for connecting the control arms associated with each stopcock in each row of stopcocks to each of the rails in the pair associated with that row are provided, such that the relative movement of the rails associated with a row of stopcocks simultaneously rotates each of the control arms associated with the stopcocks in that row. Means are provided for simultaneously moving the rails in each pair relative to each other. Means are also provided for locking the rails in a given relative position.

The valve means includes a support and a base between which the stopcocks are mounted. The base includes an array of passages, each aligned with a different stopcock. A plurality of pairs of threaded Leur tip adapters are provided. A different pair of Leur tip adapters, each consisting of one female and one male, is situated in each of the passages.

The introduction module includes a gas manifold, a pressure plate and a septum. The gas manifold includes an array of openings, each adapted to receive a syringe needle of the liquid handler. Gas inlet needles extend downwardly form the bottom surface of the gas manifold proximate each gas manifold opening. The pressure plate also has a plurality of openings, somewhat larger then the gas manifold openings. Each pressure plate opening is aligned with a gas manifold opening and the gas inlet needle proximate thereto, as well as with the mouth of a different one of the vessels in the reactor block. The introduction module is mounted over the reactor module such that the syringe needle from the liquid handler and one gas inlet needle can deliver reagents and inert gas to the vessel.

The pressure plate openings are each defined by a downwardly projecting rim. The pressure plate opening rims cooperate with the septum to seal the mouths of each of the reactor vessels in the reactor block.

The discharge module includes a collector block. The collection block comprises an array of individual collection wells. Each collection well is aligned with a different one of the reactor vessels, when the reactor module is mounted over the discharge module.

The discharge module may consist of a drain block. The drain block includes a drain channel. The reactor vessels are mounted in the reactor block in rows. The drain block includes a drain channel for each of the rows.

The nesting means includes first and second brackets spaced to form a nest. Each of the brackets consists of a base portion and an upstanding wall. Each of the work stations includes a platform. Means are provided for affixing the base portion of each of the brackets to the platform. Means are provided for removably securing the apparatus to the brackets. The upstanding wall brackets include an interior surface with an inclined portion to facilitate alignment of the apparatus within the nesting means.

In accordance with another aspect of the present invention, mobile apparatus for the simultaneous synthesis of multiple organic compounds is provided for use with one or more work stations. The apparatus includes a reactor module. The reactor module includes an array of individual reaction vessels each with an outlet port. Mechanical valve means are provided for regulating the passage of fluid through the outlet ports. A plurality of pairs of Leur tip adapters are provided, each pair aligned with a different one of the outlet ports. Each pair of the Leur tip adapters terminates in an outlet. The apparatus also includes a discharge module including a plurality of openings. Means are provided for mounting the reactor module on the discharge module with the Leur tip adapters pair outlets received in the openings.

A fluid tight connection is maintained between the reactor module and the discharge module through the use of an O-ring seal. The seal is situated along the top rim of the discharge module.

In accordance with another aspect of the present invention, a reactor module is provided for use in mobile apparatus for the simultaneous synthesis of multiple organic compounds. The apparatus is designed for use in conjunction with one or more work stations each having a platform supporting a nest site adapted to receive the apparatus. The reactor module includes a block including an array of reactor vessel receiving openings. A plurality of reactor vessels, each having an outlet port, are provided. Gang-controlled mechanical valve means regulate the passage of fluids from the outlet ports of the reactor vessels.

Each of the reactor vessels may consist of a solid phase extraction cartridge, without sorbent. However, any polypropylene or glass tube with or without a snap-fit or internal filter, with a male Leur tip outlet, can be employed.

The discharge module may include a collector block with side plates to align the reactor block and the collector block. Alternately, the discharge module may consist of a drain block. The drain block includes a side plates to align it with the reactor block.

In accordance with another aspect of the present invention, valve means are provided for a reactor module of type adapted for use in apparatus for the simultaneous synthesis of multiple organic compounds. The valve means includes a housing and a plurality of stopcocks mounted within the housing. Each of stopcock includes an inlet and an outlet. A rotatable control arm is associated with each stopcock. Means are provided for simultaneously rotating each of the control arms to open and close the stopcocks.

To these and to such other objects which may hereinafter appear, the present invention relates to a nestable, modular apparatus for the simultaneous synthesis of multiple organic compounds, as described in detail in the following specification and recited in the annexed claims, wherein like numerals refer to like parts and in which:

The present invention relates to apparatus for the simultaneous solid phase synthesis of diverse organic compounds for use in combinatorial drug research. The apparatus consists of one or more stackable modules which, when assembled into a set, form a mobile unit designed to be moved among standard work stations having platforms which have been provided with one or more nesting sites adapted to receive the unit.

Figure 1:
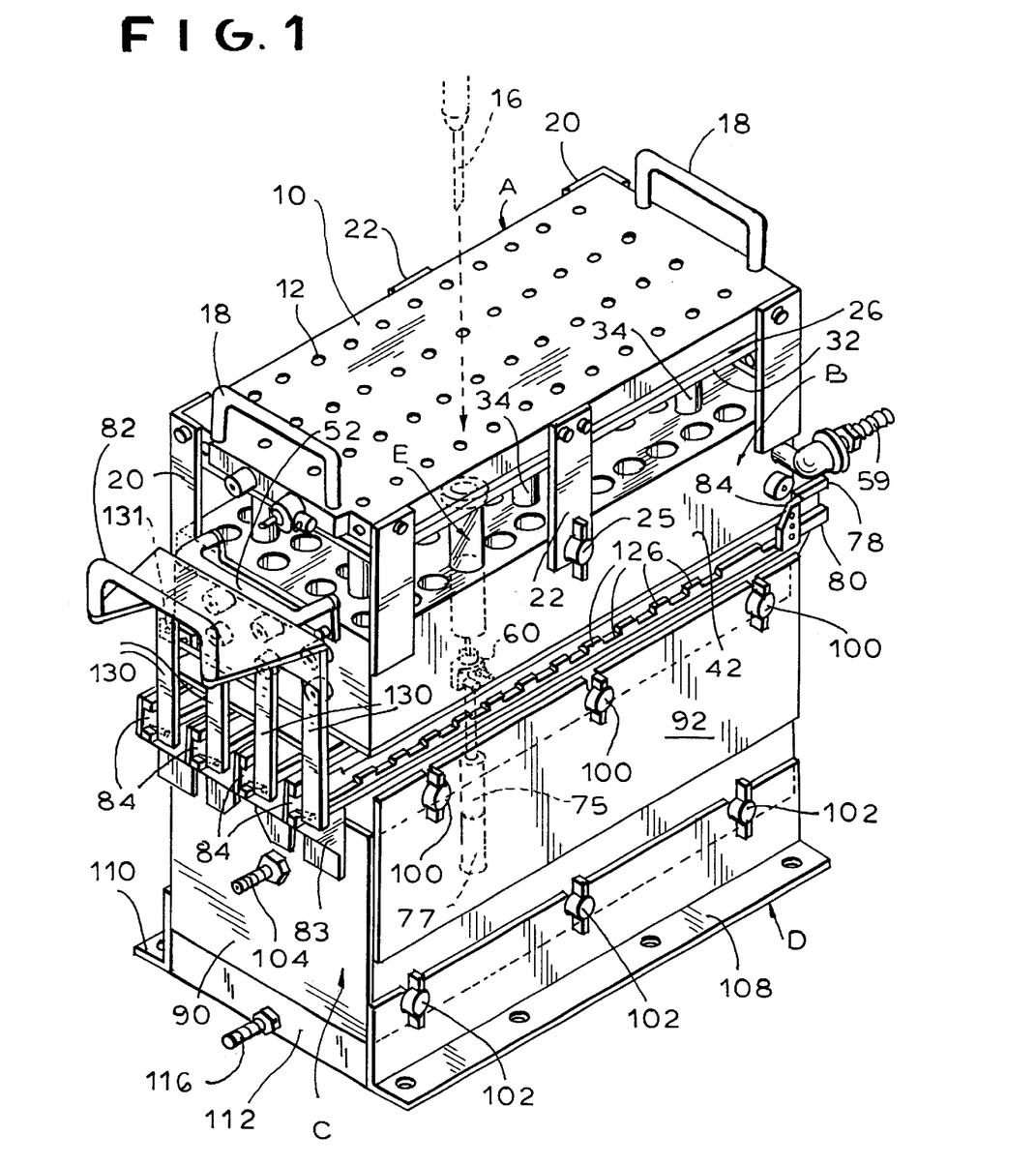
FIG. 1 is an isometric view of a typical module set of the apparatus of the present invention, mounted in a nest site.

FIG. 1 shows a typical module set situated in a nesting site. The illustrated module set includes an introduction module, generally designated A, a reactor module, generally designated B and a discharge module, generally designated C. The unit is received in a nesting site formed by a pair of spaced nesting brackets, generally designated D.

Figure 2:
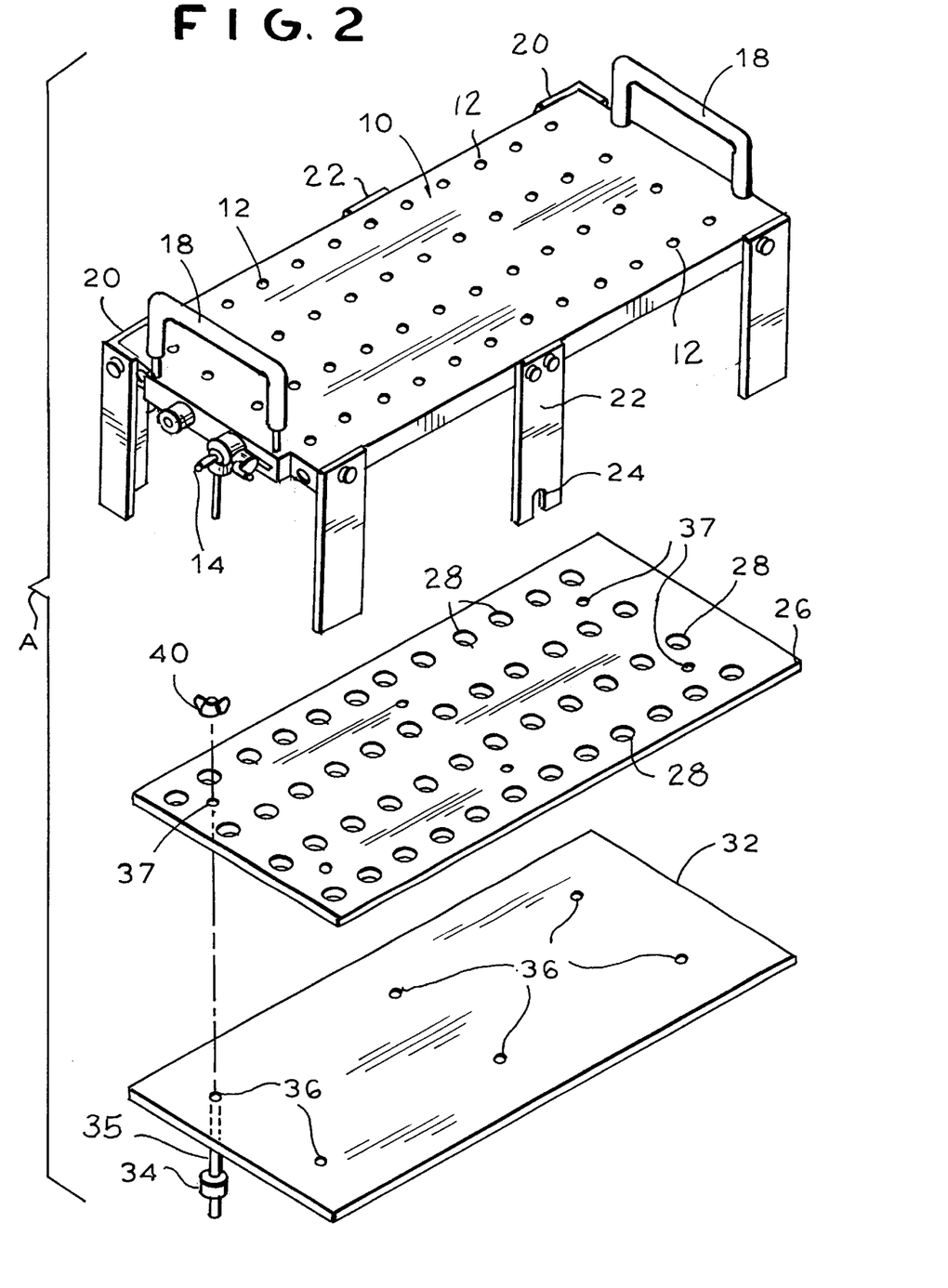
FIG. 2 is an exploded isometric view of the introduction module.

FIG. 2 illustrates the three components of introduction module A. The top portion of introduction module A includes a gas manifold 10 which has a 4×12 array of needle openings 12. A gas inlet port 14 is provided on the side of manifold 10 and is connected to an internal gas channel 15 (FIG. 7) which feeds an 4×12 array of gas inlet needles 17, each extending downward from a point on the bottom surface of manifold 10 adjacent a different one of the openings 12. The gas inlet port 14 is provided for connection to a suitable inert gas supply to maintain the appropriate gas atmosphere and pressure in the reactor vessels as injection of reagents takes place from the liquid handler syringe needles 16.

Upstanding handles 18 facilitate installation and removal of gas manifold 10. At least two of the corners of manifold 10 are provided with downwardly extending angle brackets 20 for aligning introduction module A with reactor module B. Downwardly extending brackets 22 are provided with recesses 24 for cooperating with threaded shafts which carry fasteners 25 on the outer surface of module B so as to secure module A to module B in the appropriate spaced relationship.

Below manifold 10 is situated pressure plate 26 which also includes a 4×12 array of openings 28. Plate 26 may be Teflon coated or uncoated. However, it should not be annodized. Openings 28 are aligned with but somewhat larger than openings 12 in gas manifold 10 so as to accommodate the gas inlet needles 17.

Figure 7:
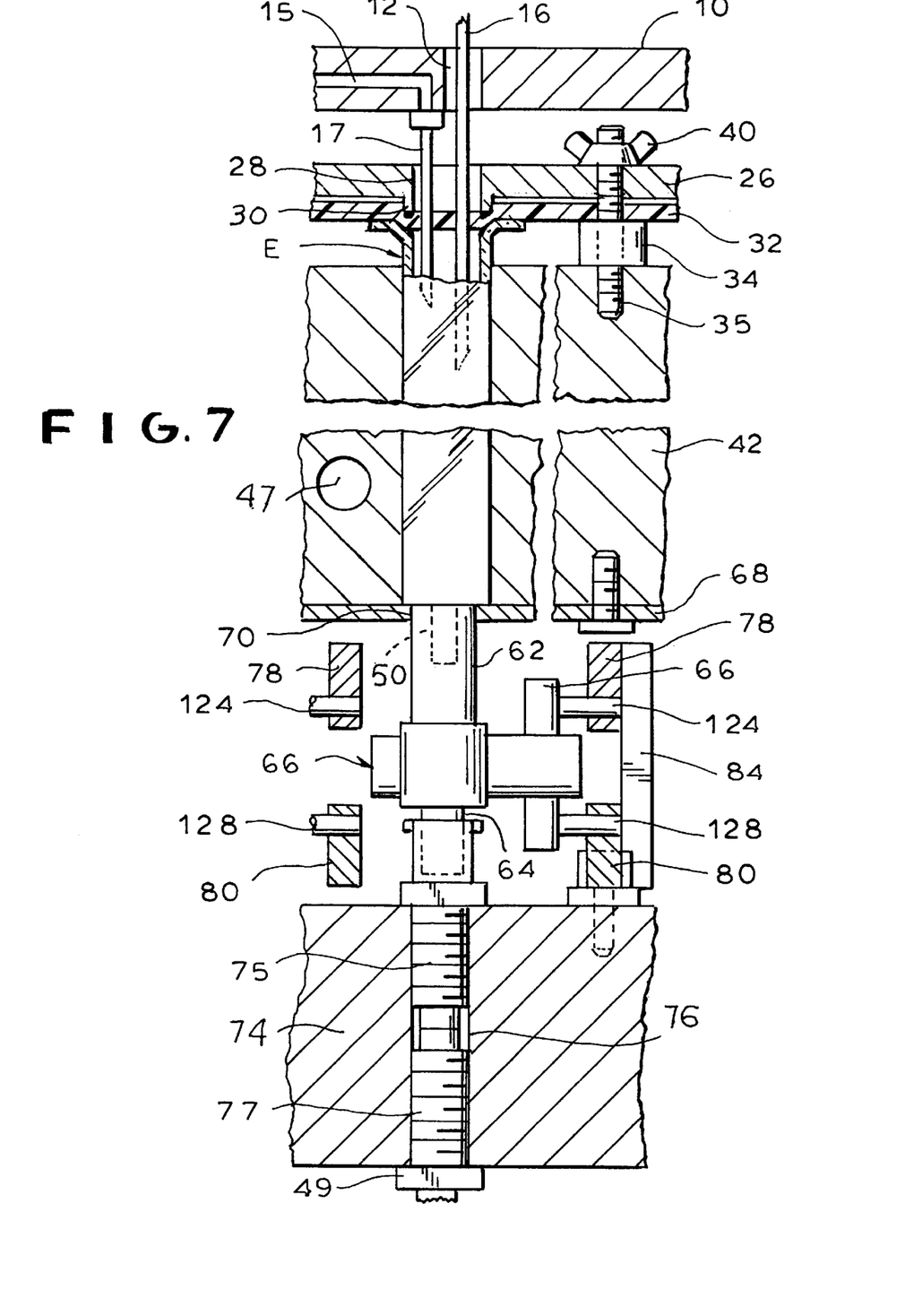
FIG. 7 is a fragmentay cross-sectional view of an assembled introduction module and reactor module showing an injector, a reactor vessel, a stopcock and Leur tip adapters.

As best seen in FIG. 7, each opening 28 in pressure plate 26 is defined by a rim 30 which protrudes downwardly beyond the lower surface of the pressure plate. A rubber septum 32 is provided below pressure plate 26. Rims 30 and septum 32, portions of which are stretched over the openings 28, cooperate with the open mouths of the individual reactor vessels E in the reactor block to seal the mouths of the vessels, eliminating the necessity for a separate stoppers or other closures but permitting introduction of fluids into the vessels under controllable conditions.

Module A is designed to interface with a standard liquid handler work station consisting of one or more syringe needles 16 mounted on a moveable arm, such as Hamilton Microlab 2200 or Tecan Genesis 150 work station. With the unit securely nested on a platform in the liquid handler work station and the needle(s) 16 of the syringe(s) properly aligned with openings 12 in gas manifold 10, reagents, solvents or other liquids can be introduced into the separate reactor vessels with the needles 16 extending through openings 12 in manifold 10, openings 28 in plate 26 and penetrating the septum portions stretched tightly over the mouths of the vessels. The introduction of liquids can take place in the presence of any gas, at regulated pressure and temperature, introduced into the reactor vessels by gas inlet needles 17, which also penetrate the stretched septum portions.

Below pressure plate 26 are located a plurality of internal spacers 34. Bolts 35 extend from the tops of the spacers 34 extend through openings 36 in the septum and openings 37 in the pressure plate. The bolts are attached by nuts 40 to secure plate 26 to module B and maintain the appropriate distance between module A and module B to insure positive interengagement between rims 30 and the mouths of the reactor vessels E seated in module B.

Figure 3:
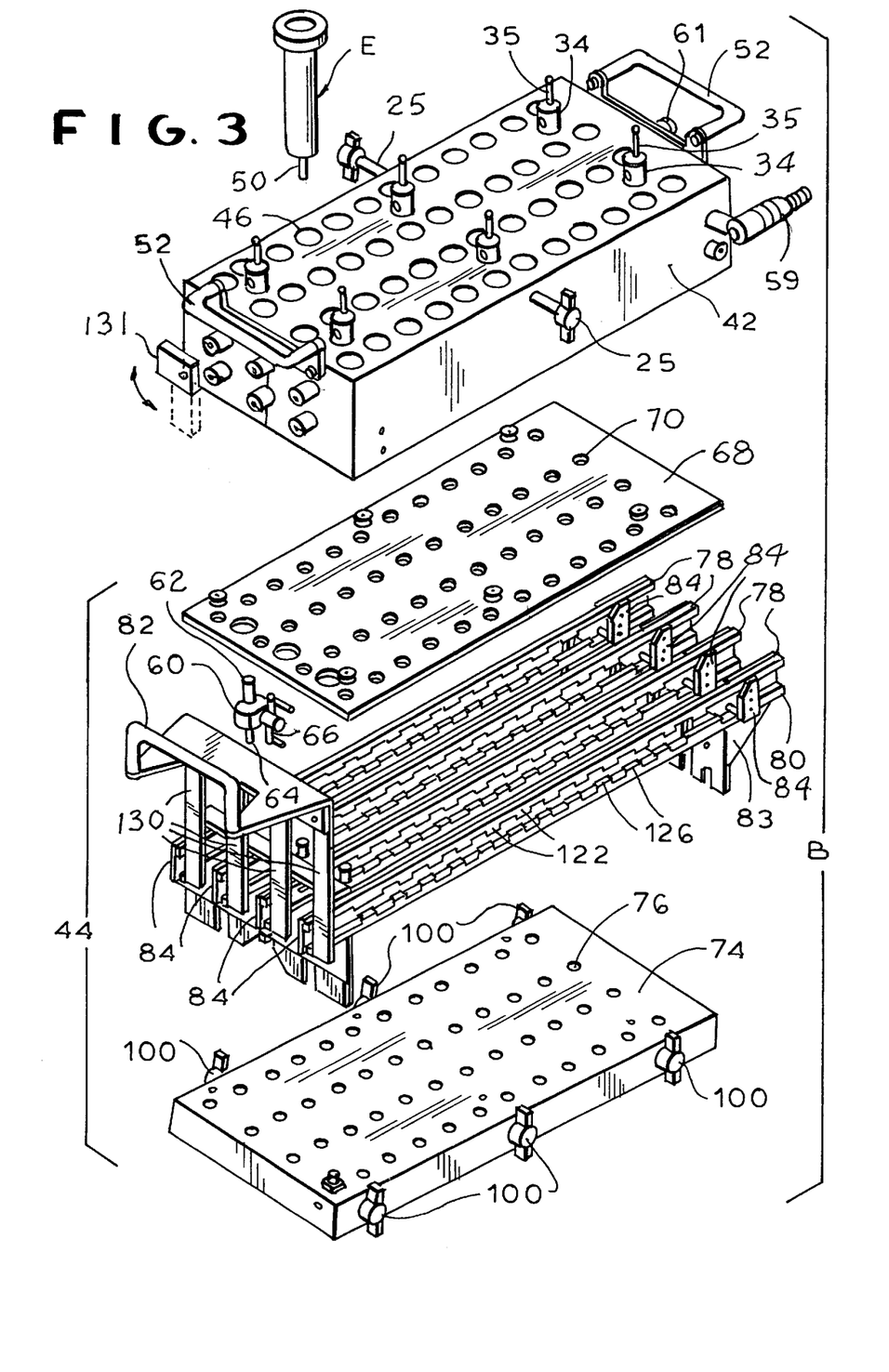
FIG. 3 is an exploded isometric view of the reactor module including the valve means housing and control arm positioning rails.

FIG. 3 illustrates the components of the reactor module B. Module B consists of a temperature control reactor block 42 and a gang controlled valve array 44. Block 42 has four rows of wells 46, twelve wells in each row. Each well is adapted to receive a reactor vessel E. Vessels E may any polypropylene or glass tube with or without a snap-fit or internal filter. However, we have found that commercially available solid phase extraction cartridges, without sorbent, function extremely well in this regard. Each vessel E has a male Leur tip as an outlet port 50 located at its bottom.

Handles 52 extend outwardly from the sides of block 42 and facilitate movement of the reactor module B. Block 42 is provided with a fluid input 59 and a fluid output port 61 which connect to channels 47 within block 42 to permit fluids to circulate around each vessel E. By introducing fluids of particular temperature into the block channels, extremely accurate control over the temperature of the reactor vessels is possible.

Valve array 44 consists of an array of stopcocks 60, one aligned with each vessel E. Only one stopcock 60 is illustrated in FIGS. 1 and 3 so as not to obscure the details of the control mechanism. Stopcocks 60 each include an upstanding inlet tube 62 with an inlet port on top, a downwardly extending outlet tube 64 with an outlet port on the bottom. A rotatable control arm 66. The inlet tube 62 of each stopcock is connected to the outlet port 50 of the bottom of the aligned reactor vessel E.

A stopcock support plate 68 forms the top part of the valve housing. It is provided with a plurality of openings 70 through which the upstanding inlet tube 62 of each stopcock is received. Plate 68 functions to stabilize the tops of the stopcocks.

Base 74 forms the bottom part of the valve housing. It functions to stabilize the bottoms of the stopcocks. Base 74 has a plurality of channels 76. Each channel is internally threaded to receive an externally threaded upwardly extending female Leur tip adapter 75 and an externally threaded downwardly extending male Leur tip adapter 77. Leur tip adapters 75, 77 are preferably made of TEFZEL. The top of each upwardly extending female Leur tip adapter 75 receives the outlet tube 64 from the bottom of the aligned stopcock. The bottom 49 of each downwardly extending male Leur tip adapter 77 is received in the opening of discharge block, as explained below.

The stopcocks are opened and closed by mechanical linkage which consists of four pairs of vertically aligned rails 78, 80, one pair for each of the four rows of stopcocks. The rails within each pair are moveable relative to each other to simultaneously rotate the control arms 66 associated with the stopcocks 60 in the associated row. The rails of each rail pair are each connected by a pivotable bracket to an element 130 so that each rail pair can be operated individually to control the stopcocks in each row by moving element 130. However, all four elements 130 can be linked together by handle 82 as illustrated and operated simultaneously by pivoting handle 82, which is accessible from the exterior on the module.

The rails of each pair are supported at each end by a pivotable bracket 84. Each bracket 84 has a shoulder screw 86 affixed to the housing about which it pivots. A shoulder screw 88 pivotally connects the top of the bracket 84 to the top rail 78. A bottom shoulder screw 90 pivotally connects the bottom of bracket 84 to the bottom rail 80.

The rails 78, 80 in each pair are pivotally connected to the opposite ends of the control arms 66 associated with the stopcocks 60 in the associated row. As the rails 78, 80 are moved relative to each other, the stopcock control arms 66 associated with the stopcocks 60 in the associated row are rotated simultaneously to regulate the opening and closing of the stopcocks.

Figure 4:
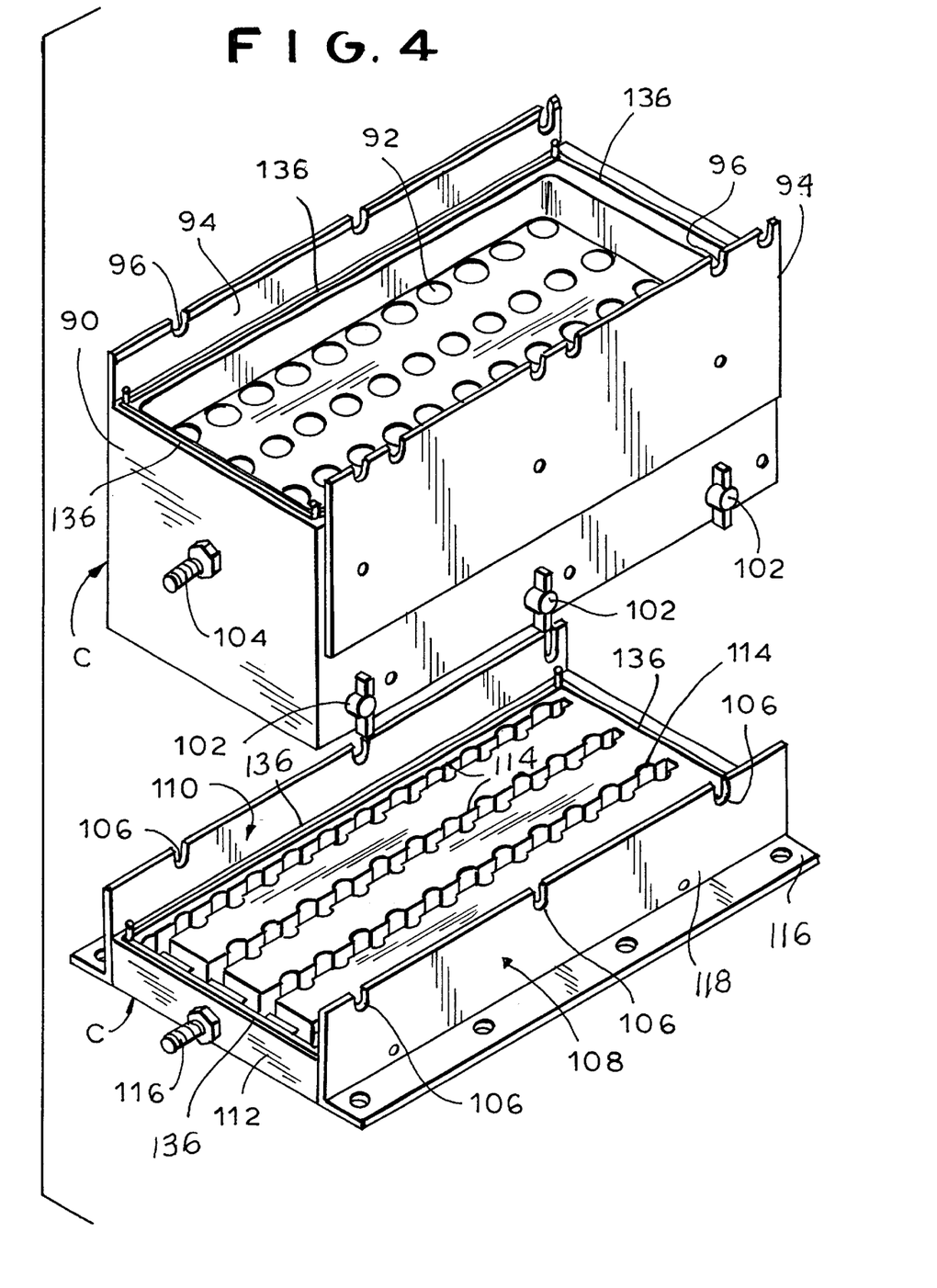
FIG. 4 is an isometric view of the collector block and of the drain block of the discharge module and the nest brackets.

FIG. 4 illustrates the two blocks which can be used alternately as the discharge module C, depending upon whether it is desired to collect the fluids discharged from the reactor vessels for testing or to discard same, for example, when the material contained in the apparatus is being washed. Collection of specimens from the reactor vessels E is performed by using collector block 90 which consists of an array of wells 92, each aligned with one of the Leur tip adapater pairs leading from a stopcock 60. Each well 92 is adapted to receive an open mouth collection vessel, not shown. Each well is sized to tightly receive the downwardly extending bottom 49 of the aligned Leur tip adapter 77 to provide a connection between the stopcocks and the wells. Collector block 90 is provided with a port 104 for connection to a vacuum pump which can be actuated to assist in drawing the liquid into the collection tubes.

Collector block 90 is provided with upstanding side brackets 94. Brackets 94 extend upwardly above the surface of block 90 so as to facilitate alignment of the reactor module B as it is received over the discharge module C. Brackets 94 are provided with slots 96 adapted to receive the bolts protruding from the sides of base 74. The nuts 100 on the bolts are tightened to secure the reactor module over the discharge module.

Bolts and nuts 102 protrude from the side of block 90 near the bottom thereof. These bolts are adapted to be received in slots 106 in nesting brackets 108, 110 to secure the unit to the work station platform.

In the event that the fluids from the reactor vessels are to be discarded, such as during a washing procedure, drain block 112 is utilized instead of collector block 90. In this case, the bolts of base 74 are received in slots 106 of brackets 108 and 110 after block 112 is situated between the brackets.

Block 112 consists of four open channels 114, one channel aligned with each row of stopcocks. All of the channels lead to a common outlet port 116. In this way, any row of reaction vessels can be drained individually or all rows can be drained at the same time. Channels 114, like wells 92, are shaped to receive the downwardly extending ends 49 of Leur tip adapters 77.

Figure 5:
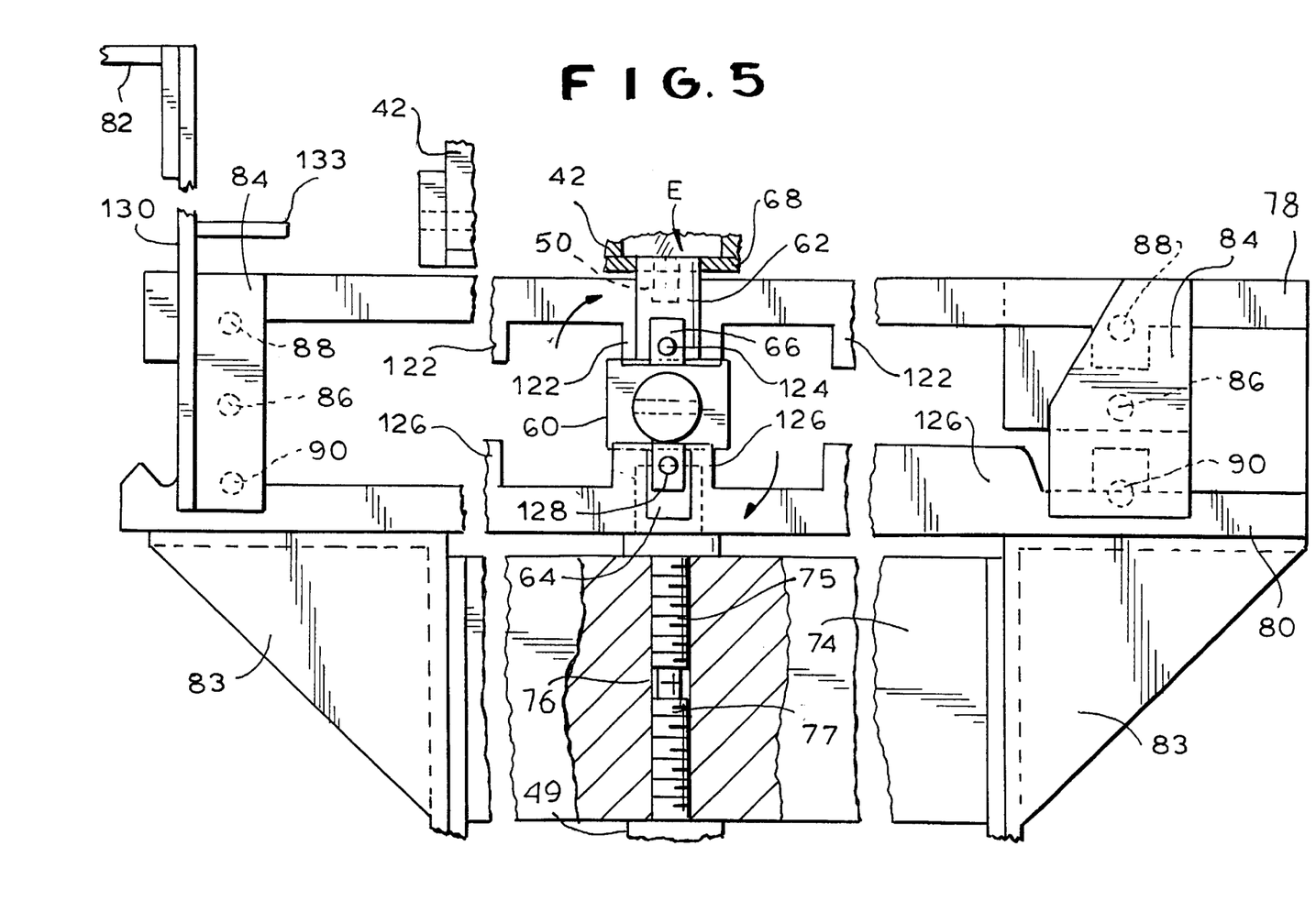
FIG. 5 is a side view of the valve means showing a stopcock and rails in the open position.
Figure 6:
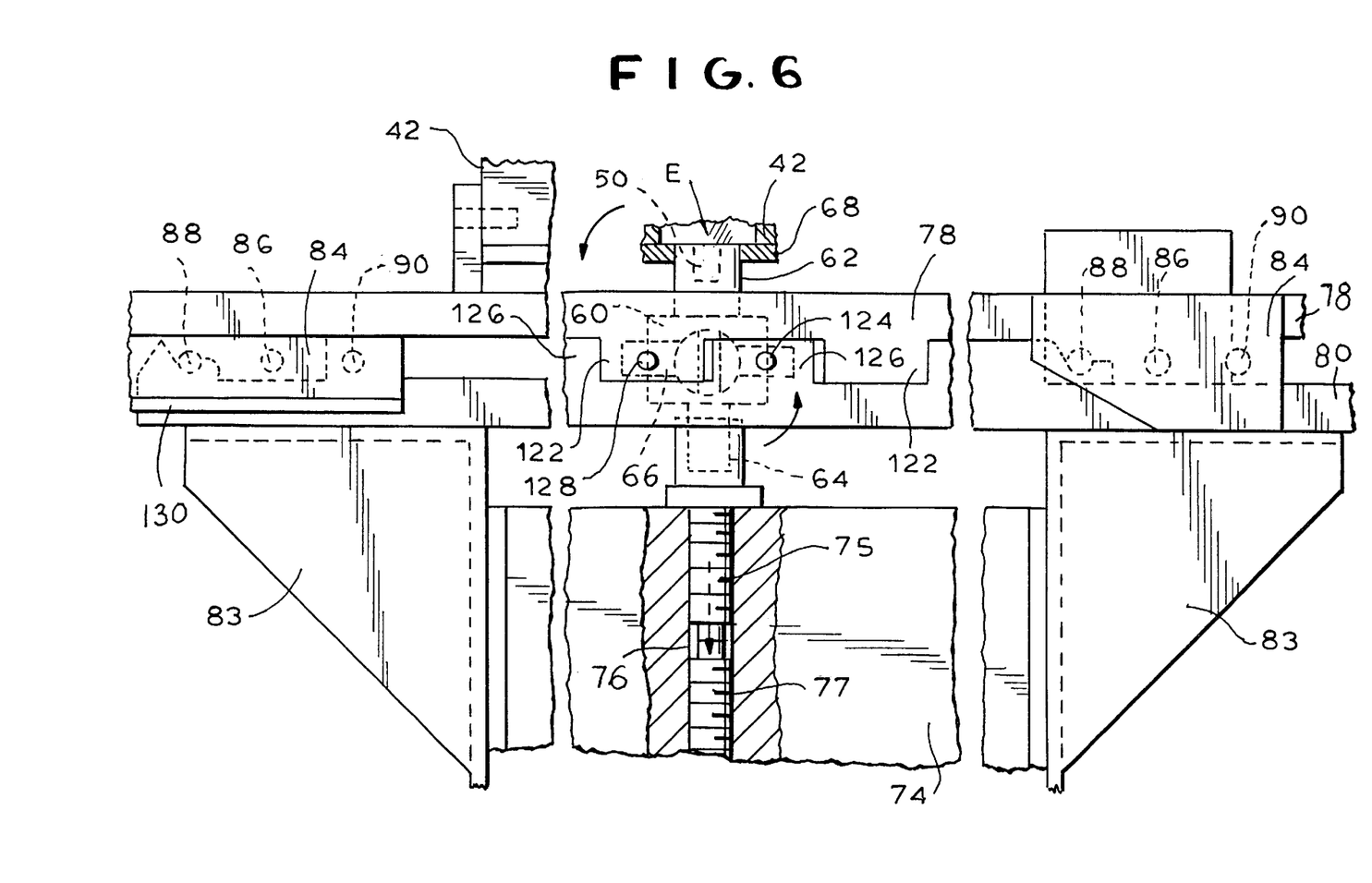
FIG. 6 is a side view similar to FIG. 5 but showing the stopcock and rails in the closed position.

FIGS. 5 and 6 illustrate the operation of the gang controlled valve array. In FIG. 5, stopcock 60 is shown in the open position with associated control arm 66 and brackets 84 each oriented in a vertical direction. Brackets 84 rotate about shoulder screws 86 which are attached to the housing 83. Top shoulder screw 88 of each bracket 84 is pivotally connected to rail 78. Upper rail 78 includes a plurality of downwardly extending teeth 122. The top pin 124 of each control arm 66 is pivotally connected to one of the teeth 122.

Similarly, bottom shoulder screw 90 of each bracket 84 is connected to lower rail 80. The lower rail 80 has a plurality of the upwardly extending teeth 126. The lower end of each control arm 66 is pivotally connected to one of the teeth 126 of the lower rail 88 by a pin 128.

Handle 82 is connected to the brackets 84 by elements 130. As handle 82 is moved from a vertical position (FIG. 5) to a horizontal position (FIG. 6), brackets 84 rotate counterclockwise (as seen in these figures) about shoulder screws 86. This causes upper rail 78 to travel in an arcuate path towards the left and downwards and lower rail 80 to travel in an arcuate path towards the right and upwards (as seen in these figures). This movement causes the rail teeth 122, 126 to intermesh, the teeth of one rail being received in the recesses defined between the teeth in the mating rail, as seen in FIG. 6. This relative movement of the rails causes the control arms 66 to move from a vertical position (FIG. 5) to a horizontal position (FIG. 6), closing the associated stopcocks. Since the control arms associated with all of the stopcocks in each row are connected to a single pair of rails, all of the stopcocks in a row are simultaneously controlled by movement o f a single pair of rails.

As seen in FIG. 1, the brackets 84 for each rail pair can be connected by elements 130 to a single handle 82 and thus the stopcocks in all of the rows can be controlled simultaneously by handle 82. However, the rails pairs can be controlled individually, if desired, by removing handle 82.

Intermeshing teeth 122, 128 extending from rails 78, 80 permit the rails to be moved to a relative position wherein the control arms 66 of each of the associated stopcocks 60 are oriented to completely close the stopcocks. A lock element 131 is provided pivotally mounted on block 42 to cooperate with bracket 133 to maintain handle 82 in a position where the rails retain the control arms of all of the stopcocks in the completely closed position (FIG. 6) to prevent accidental leakage.

FIG. 7 is a cross-sectional view of a typical module set illustrating the manner in which the mouths of the reactor vessels E are sealed by the pressure plate 26, the connection between the reactor vessel outlet ports and the stopcocks, as well as the connection between the stopcocks and the Leur tip adapters in base 74.

As indicated above, the open mouth of each reactor vessel E is aligned with one of the openings 28 in pressure plate 26. Each opening 28 is defined by rim 30 which extends below the surface of the pressure plate. Rim 30 causes the aligned portion of the septum 32 to stretch. The rim and stretched septum portion are received within and securely seal the mouth of the vessel. This permits gas inlet needles 14 and the syringe needles 16 from the liquid handler to introduce fluids directly into the reactor vessels while the mouths of the vessels remain sealed.

The outlet port 50 of each reactor vessel E protrudes downwardly from the bottom of the vessel and terminates in the inlet tube 62 of the aligned stopcock 60. The stopcock support plate 68 stabilizes the stopcocks such that a fluid tight seal is maintained between the reactor vessel outlet port and the stopcock.

The downwardly extending outlet tube 64 of the stopcock is received within the portion of the female Leur tip adapter 75 extending above the upper surface of base 74. This portion of Leur tip adapter 75, the stopcocks 60 and the rail mechanism are sandwiched between stopcock support plate 68 and base 74 to maintain a fluid tight connection between the stopcock and the Leur tip adapter 75. The bottom end 49 of the male Leur tip adapter 77 extends downwardly beyond the bottom surface of base 74 and is received in the inlet openings in the discharge module.

As best seen in FIG. 4, the rim of the discharge module C, whether in the form of collector block 90 or drain block 112, is provided with a sealing member 136 in the form of an O-ring. Member 136 provides a fluid tight seal between the reactor module and the discharge module.

Figures 8, 9, 10, 11:
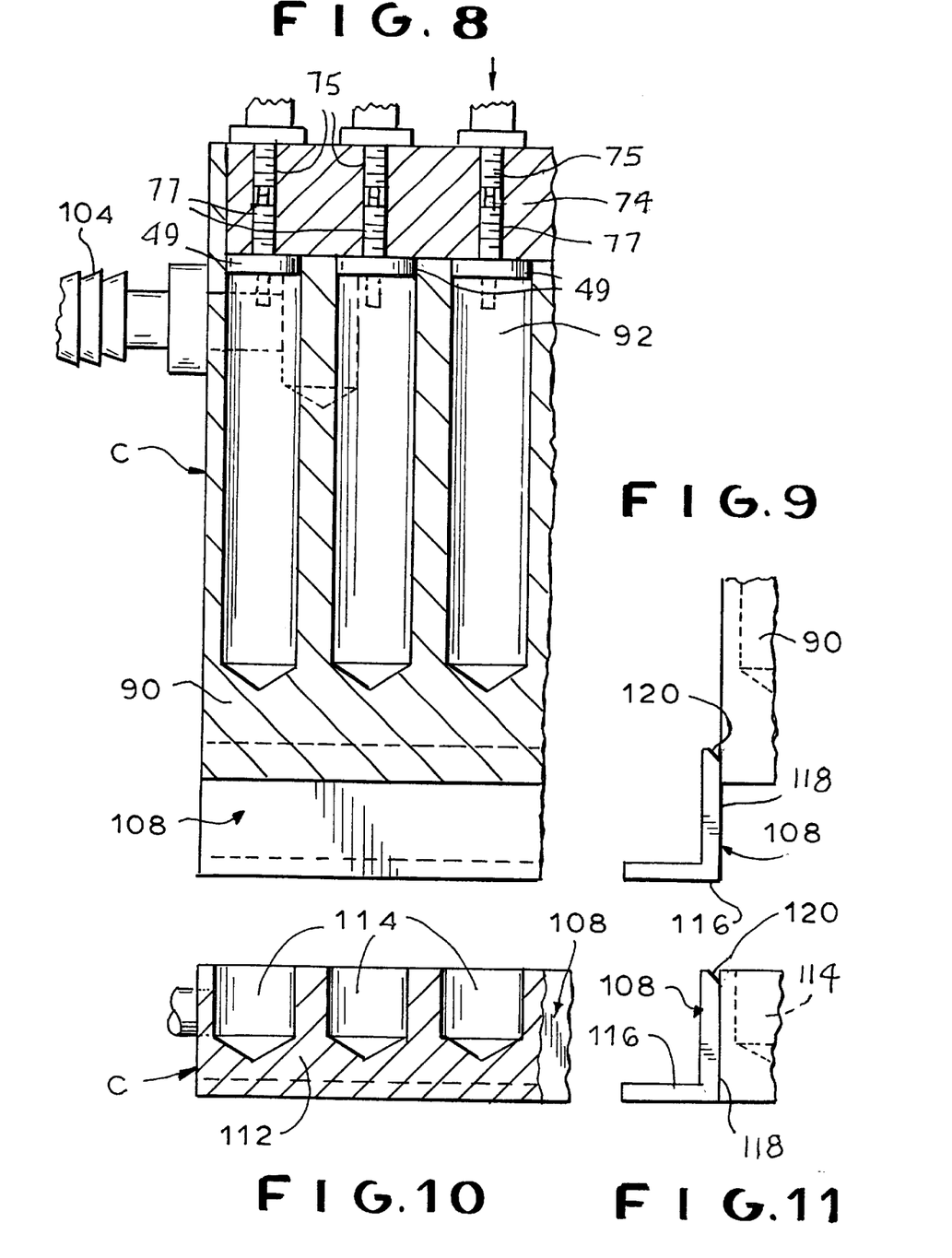
FIG. 8 is a fragmentary cross-sectional view of a portion of the reactor block and the collector block.
FIG. 9 is a fragmentary side view of the collector block and nesting bracket.
FIG. 10 is a fragmentary cross-sectional view of the drain block.
FIG. 11 is a fragmentary side view of the drain block and nesting bracket.

FIGS. 9 and 11 illustrate the structure of nesting brackets 108. Each bracket consists of a base part 116 adapted to be secured to a work station platform by screws or other suitable fasteners (not shown) and an upstanding part 118 with an inclined or chamfered edge 120 to guide the module into the nest.

It will now be appreciated that the present invention relates to a nestable, modular apparatus for the simultaneous synthesis of multiple organic compounds for use in combinatorial drug reseach or related endeavors. The apparatus comprises a number of stackable modules which form module sets. The module sets are moveable among work stations having platforms with nesting sites.

The module sets may include an introduction module, a reactor module and a discharge module. The discharge module may be a collector block or a drain block. Angle brackets and internal pins are used to insure correct alignment between modules.

The reactor module includes a temperature controllable reactor block with an array of reactor vessel receiving wells. Solid phase extraction cartridges, without sorbent, are preferred for use as reactor vessels. Below the reactor block is a mechanical valve array consisting of rows of gang-controlled stopcocks. The stopcocks in each row are regulated through the use of relatively moveable rail pairs with intermeshing teeth which insure complete closure of the stopcocks. Pairs of Leur tip adapters are used to connect the stopcocks to the discharge module.

While only a single embodiment of the present invention has been disclosed for purposes of illustration, it is obvious that many variations and modifications could be made thereto. It is intended to cover all of these variations and modifications which fall within the scope of the present invention, as defined by the following claims:

We claim:

1. Apparatus for the simultaneous synthesis of multiple organic compounds, the apparatus comprising a reactor module adapted to receive an array of individual reactor vessels, a plurality of reactor vessels each having an outlet port and mechanical valve means for regulating the passage of fluids through said reactor vessel output ports, said valve means comprising an array of stopcocks, each of said stopcocks having an associated movable control arm and means for simultaneously rotating said control arms to open and close said stopcocks, said means for simultaneously rotating said control arms comprising first and second relatively moveable rails and means for connecting said control arms to each of said rails such that the relative movement of said rails simultaneously rotates said control arms connected thereto, each of said rails comprising a plurality of protrusions and recesses, said protrusions of one of said rails being received within said recesses of the other of said rails, when said rails are moved toward each other.

2. The apparatus of claim 1 wherein said stopcocks are arranged in rows and wherein said means for simultaneously rotating said control arms comprises first and second relatively moveable rails associated with each row of stopcocks, means for connecting the control arms associated with the stopcocks in each row to each of the rails associated with said row, such that the relative movement of the rails associated with a row of stopcocks simultaneously rotates said control arms associated with said stopcocks in said row.

3. The apparatus of claim 2 further comprising means for simultaneously moving said first and second rails associated with each row of stopcocks relative to each other.

4. The apparatus of claim 2 further comprising means for locking said first and second rails in a given relative position.

5. The apparatus of claim 2 further comprising a support plate associated with each stopcock and a base.

6. The apparatus of claim 5 wherein said base comprises an array passages, each aligned with a different stopcock and a plurality of Leur tip adapter pairs, a different one of said Leur tip adapter pairs being situated in each of said passages.

7. The apparatus of claim 6 wherein said stopcock array and said means for simultaneously rotating said control arms are situated between said stopcock support plate and said base.

8. Apparatus for the simultaneous synthesis of multiple organic compounds, the apparatus comprising a reactor module adapted to receive an array of individual reactor vessels, a plurality of reactor vessels each having an outlet port, valve means for regulating the passage of fluids through said reactor vessel output ports, an introduction module and means for mounting said introduction module over said rector module, said introduction module comprising a gas manifold, a pressure plate and a septum.

9. The apparatus of claim 8 wherein said gas manifold comprises an array of openings and a plurality of downwardly extending gas inlet needles, each situated proximate a different one of said openings, each of said openings and the gas inlet needle proximate thereto being adapted to align with the mouth of a different one of said reactor vessels, when said introduction module is mounted on the reactor module.

10. The apparatus of claim 9 wherein said pressure plate comprises an array of openings, each of said openings in said pressure plate being aligned with a different one of said gas manifold openings and the gas inlet needle proximate thereto.

11. The apparatus of claim 8 wherein said pressure plate has a plurality of openings, each of said pressure plate openings being defined by a downwardly projecting rim which cooperates with a portion of said septum, each of said openings in said pressure plate aligning with a different one of said reactor vessels, such that said rim and septum portion are received within the mouth of the aligned reactor vessel, when said introduction module is received over said reactor module.

* * * * *